United States Patent
Hamachi

(10) Patent No.: US 9,426,733 B2
(45) Date of Patent: Aug. 23, 2016

(54) COMMUNICATION APPARATUS, METHOD FOR CONTROLLING THE COMMUNICATION APPARATUS, AND STORAGE MEDIUM

(75) Inventor: Toshifumi Hamachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1003 days.

(21) Appl. No.: 13/414,171

(22) Filed: Mar. 7, 2012

(65) Prior Publication Data

US 2012/0233338 A1 Sep. 13, 2012

(30) Foreign Application Priority Data

Mar. 10, 2011 (JP) ................................ 2011-053557
Jan. 30, 2012 (JP) ................................ 2012-017271

(51) Int. Cl.
| | | |
|---|---|---|
| *G06F 15/16* | (2006.01) | |
| *H04W 48/20* | (2009.01) | |
| *H04W 12/08* | (2009.01) | |
| *H04L 29/06* | (2006.01) | |
| *H04W 84/12* | (2009.01) | |

(52) U.S. Cl.
CPC .............. *H04W 48/20* (2013.01); *H04W 12/08* (2013.01); *H04L 63/105* (2013.01); *H04W 84/12* (2013.01)

(58) Field of Classification Search
CPC .............. H04L 19/06; H04L 29/08576; H04L 29/080722
See application file for complete search history.

(56) References Cited

U.S. PATENT DOCUMENTS

| | | | | |
|---|---|---|---|---|
| 2006/0187858 | A1* | 8/2006 | Kenichi et al. | 370/254 |
| 2006/0246946 | A1* | 11/2006 | Moritomo | H04L 63/162 455/557 |
| 2007/0140163 | A1* | 6/2007 | Meier et al. | 370/329 |
| 2009/0191866 | A1* | 7/2009 | Flore et al. | 455/434 |
| 2011/0202643 | A1* | 8/2011 | Goto | H04W 48/16 709/221 |
| 2011/0238848 | A1* | 9/2011 | Tachibana | H04W 28/18 709/228 |
| 2012/0208549 | A1* | 8/2012 | Lau et al. | 455/456.1 |
| 2013/0150012 | A1* | 6/2013 | Chhabra et al. | 455/418 |

FOREIGN PATENT DOCUMENTS

| | | |
|---|---|---|
| JP | 2010-041066 A | 2/2010 |
| JP | 2010-056916 A | 3/2010 |

OTHER PUBLICATIONS

Wi-Fi Certified Wi-Fi Protected Setup™: Easing the User Experience for Home and Small Office Wi-Fi® Networks (2010), http://www.wi-fi.org/knowledge-center/white-papers/wi-fi-protected-setup%E2%84%A2-easing-user-experience-home-and.

(Continued)

*Primary Examiner* — Philip Chea
*Assistant Examiner* — Van Kim T Nguyen
(74) *Attorney, Agent, or Firm* — Carter, DeLuca, Farrell & Schmidt, LLP

(57) ABSTRACT

A communication apparatus comprises: a detection unit configured to detect a communicable network; a determination unit configured, if a plurality of networks are detected by the detection unit, to determine a base station constructing the detected networks; and a connection unit configured to perform connection processing in accordance with the result of determination by the determination unit.

13 Claims, 17 Drawing Sheets

(56) References Cited

OTHER PUBLICATIONS

IEEE Computer Society, "IEEE Standard for Information technology for Information technology—Telecommunication and information exchange between systems—Local and metropolitan area networks—Specific requirements, Part 11: Wireless LAN Medium Access Control(MAC) and Physical Layer (PHY) Specifications", IEEE Std 802.11-2007, Revision of IEEE Std 802.11-1999. http://standards.ieee.org/findstds/standard/802.11-007.html.

Japanese Office Action issued in corresponding application No. 2012-017271 on Apr. 20, 2015.

* cited by examiner

FIG. 10

| NETWORK | ESSID | BSSID | SECURITY METHOD | ENCRYPTION KEY |
|---|---|---|---|---|
| NW1 | AAA | 00:11:22:33:44:55 | WPA1-TKIP/WPA2-TKIP | XXX |
| NW2 | BBB | 02:11:22:33:44:55 | OPEN-WEP64 | YYY |
| NW3 | AAA | 00:AA:BB:CC:DD:EE | WPA1-TKIP/WPA2-AES | ZZZ |

FIG. 18

| NETWORK | ESSID | BSSID | SETTING METHOD | IDENTIFICATION INFORMATION |
|---|---|---|---|---|
| NW1 | AAA | 00:11:22:33:44:55 | Type-A | IE |
| NW2 | typeB | 02:11:22:33:44:55 | Type-B | ESSID |
| NW3 | AAA | 00:AA:BB:CC:DD:EE | NOT AVAILABLE | NULL |

COMMUNICATION APPARATUS, METHOD FOR CONTROLLING THE COMMUNICATION APPARATUS, AND STORAGE MEDIUM

BACKGROUND OF THE INVENTION

1. Field of the Invention

The present invention relates to a communication apparatus that selects a network to which a connection is to be established out of a plurality of networks, a method for controlling the communication apparatus, and a storage medium.

2. Description of the Related Art

In wireless communication, which is typified by wireless LANs in conformity with the IEEE 802.11 standard series, there are a large number of communication parameters that must be set. Examples of such communication parameters include an ESSID, which is a network identifier, an encryption method, an encryption key, an authentication method, and an authentication key, and it is very troublesome for a user to manually enter these parameters.

For this reason, many automatic setting methods (hereinafter simply referred to as "automatic setting") for easily setting communication parameters in a wireless device have been devised. In the automatic setting as described above, one device provides communication parameters to the other device using a procedure and messages that have been predetermined between the devices to be connected to each other, thereby automatically performing setting of the communication parameters.

"Wi-Fi CERTIFIED for Wi-Fi Protected Setup: Easing the User Experience for Home and Small Office Wi-Fi Networks, http:/www.wi-fi.org/wp/wifi-protected-setup" discloses the Wi-Fi Protected Setup (hereinafter referred, to as the "WPS"), which is an industry standard for automatic setting of communication parameters between an access point (hereinafter referred to as "AP") and a station (hereinafter referred to as "STA").

Once the STA has obtained communication parameters by automatic setting as described above, it searches for a network therearound and connects to a network corresponding to the obtained communication parameters.

Meanwhile, in recent years, APs are equipped with various functions, among which is a function called "multi-BSSID (Multi Basic Service Set Identifier)". The multi-BSSID is the functionality that enables a single AP to construct a plurality of wireless networks, and makes it possible to easily realize construction of a network appropriate for a particular purpose, such as a network for audio-visual devices or a network for game machines.

Moreover, some APs construct a network for automatic setting from a network for communication using the multi-BSSID to execute automatic setting.

IEEE Computer Society, "IEEE Standard for Information technology for Information technology—Telecommunication and information exchange between systems—Local and metropolitan area networks—Specific requirements, Part 11: Wireless LAN Medium Access Control(MAC) and Physical Layer (PHY) Specifications", IEEE Std 802.11-2007, Revision of IEEE Std 802.11-1999." discloses the Wi-Fi Protected Access (hereinafter referred to as the "WPA"), which is an industry standard for the encryption method, the encryption key, the authentication method, the authentication key, and the like of wireless communication connection.

The WPA includes the WPA1 and the WPA2, and there also is an AP equipped with a Mixed mode in which the WPA1 and the WPA2 can be operated simultaneously.

The STA can obtain the ESSID, the authentication method, the encryption method, the encryption key, and the like by automatic setting. On the other hand, during the stage of searching for a network to which a connection is to be established using the obtained parameters, the STA cannot obtain information of the encryption key even though it can obtain information of the ESSID, the authentication method, the encryption method, and the like.

Thus, during the stage of the search for a network, even though the STA can check agreement of the ESSIDs, the authentication methods, and the encryption methods, it cannot check agreement of the encryption keys.

For this reason, in an environment in which networks having the same ESSID, authentication method, and encryption method but different encryption keys are mixed around the STA, it is difficult to judge which network is a desired network. As a result, during the stage of connection processing, there are cases where connection processing fails due to disagreement of encryption keys. Thus, trial and error is necessitated, resulting in a problem in that extra time is taken to complete the connection.

Moreover, during automatic setting, if a plurality of networks that can provide communication parameters are detected, it has been difficult to judge whether the plurality of networks are constructed by the same base station or by different base stations. To address this issue, even in the case where a single base station is constructing a plurality of networks, for example, measures as follows have been taken: the user is caused to select a network, or automatic setting itself is ended. These measures have been factors that increase the time taken for connection processing.

In view of the above-described problems, the present invention provides a technology for efficiently searching for a network serving as a connection destination out of a plurality of networks.

SUMMARY OF THE INVENTION

According to one aspect of the present invention, there is provided a communication apparatus comprising: a detection unit configured to detect a communicable network; a determination unit configured, if a plurality of networks are detected by the detection unit, to determine a base station constructing the detected networks; and a connection unit configured to perform connection processing in accordance with the result of determination by the determination unit.

According to one aspect of the present invention, there is provided a method for controlling a communication apparatus including a detection unit, a determination unit, and a connection unit, the method comprising: executing detection in which the detection unit detects a communicable network; executing determination in which, if a plurality of networks are detected in the detection step, the determination unit determines a base station constructing the detected networks; and executing connection in which the connection unit performs connection processing in accordance with the result of determination in the determination step.

Further features of the present invention will be apparent from the following description of exemplary embodiments with reference to the attached drawings.

BRIEF DESCRIPTION OF THE DRAWINGS

FIG. 10 is a network configuration table according to the first embodiment.

FIG. 18 is a network configuration table according to the fourth embodiment.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Hereinafter, a communication apparatus according to an embodiment of the present invention will be described in detail with reference to the drawings. Although an example in which a wireless LAN system in conformity with the IEEE 802.11 series is used will be described below, the form of communication is not necessarily limited to wireless LANs in conformity with IEEE 802.11.

Figure 1:
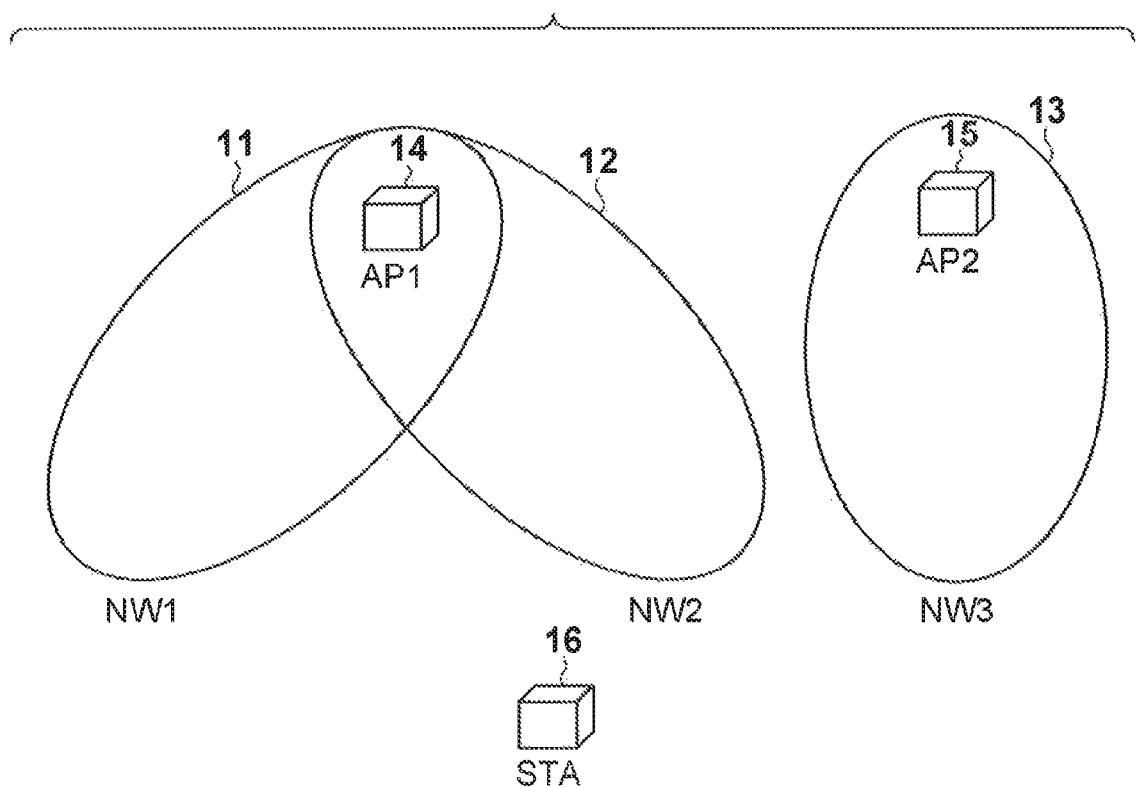
FIG. 1 is a diagram showing a network configuration.

FIG. 1 shows the configuration of a network system including a communication apparatus according to the present embodiment (hereinafter referred to as the "STA"), a first base station apparatus (hereinafter referred to as the "AP1"), and a second base station apparatus (hereinafter referred to as the "AP2").

An ellipse 11 indicates a network 1 (NW1). The NW1 is a wireless network that can be constructed by the AP1 and that is managed by the AP1. The NW1 is a network that is used mainly for data communication. An ellipse 12 indicates a network 2 (NW2). Like the NW1, the NW2 is a wireless network that can be constructed by the AP1 and that is managed by the AP1. The NW2 is a network that is used mainly for automatic setting of communication parameters. An ellipse 13 indicates a network 3 (NW3), which is a wireless network managed by the AP2. A cube 14 indicates the AP1, and the AP1 manages the NW1 and the NW2 simultaneously by means of the multi-BSSID function. A cube 15 indicates the AP2, which manages the NW3. A STA 16 is located in an area where radio waves from both of the base stations AP1 and AP2 can reach.

Figure 2:
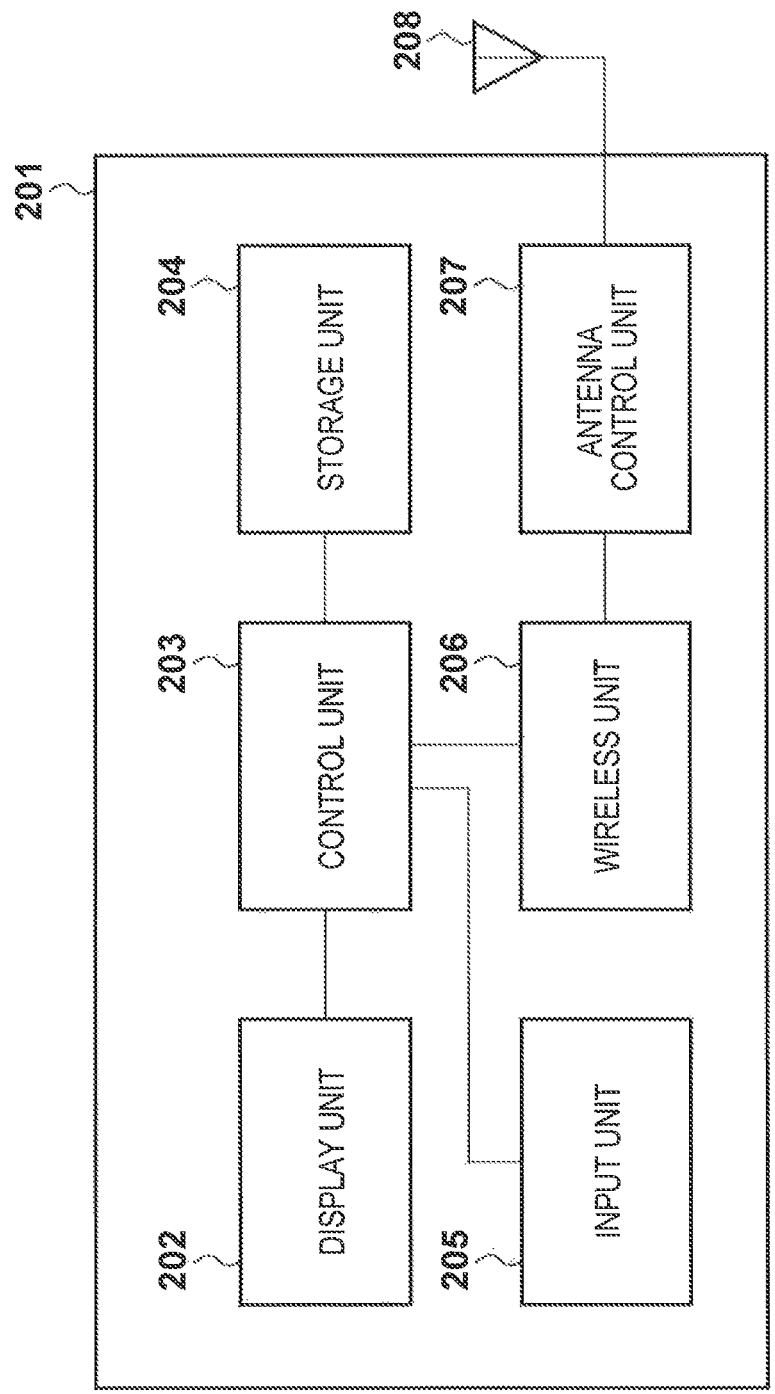
FIG. 2 is a block diagram of a communication apparatus.

FIG. 2 is a function block diagram illustrating an example of the configuration of a communication apparatus 201. The communication apparatus 201 includes a display unit 202, a control unit 203, a storage unit 204, an input unit 205, a wireless unit 206, an antenna control unit 207, and an antenna 208.

The display unit 202 is a display unit executing various displays and is capable of outputting visually perceivable information like an LCD or an LED or capable of sound output like a speaker. The control unit 203 executes a control program stored in the storage unit 204, thereby performing overall control of the communication apparatus. The storage unit 204 stores the control program to be executed by the control unit 203. Various operations that will be described later are performed by the control unit 203 executing the control program stored in the storage unit 204. The input unit 205 is used in order for the user to give an instruction that automatic setting of communication parameters should be started. The wireless unit 206 performs wireless communication. The antenna control unit 207 controls the operation of the antenna 208. The antenna 208 is controlled by the antenna control unit 207.

Figure 3:
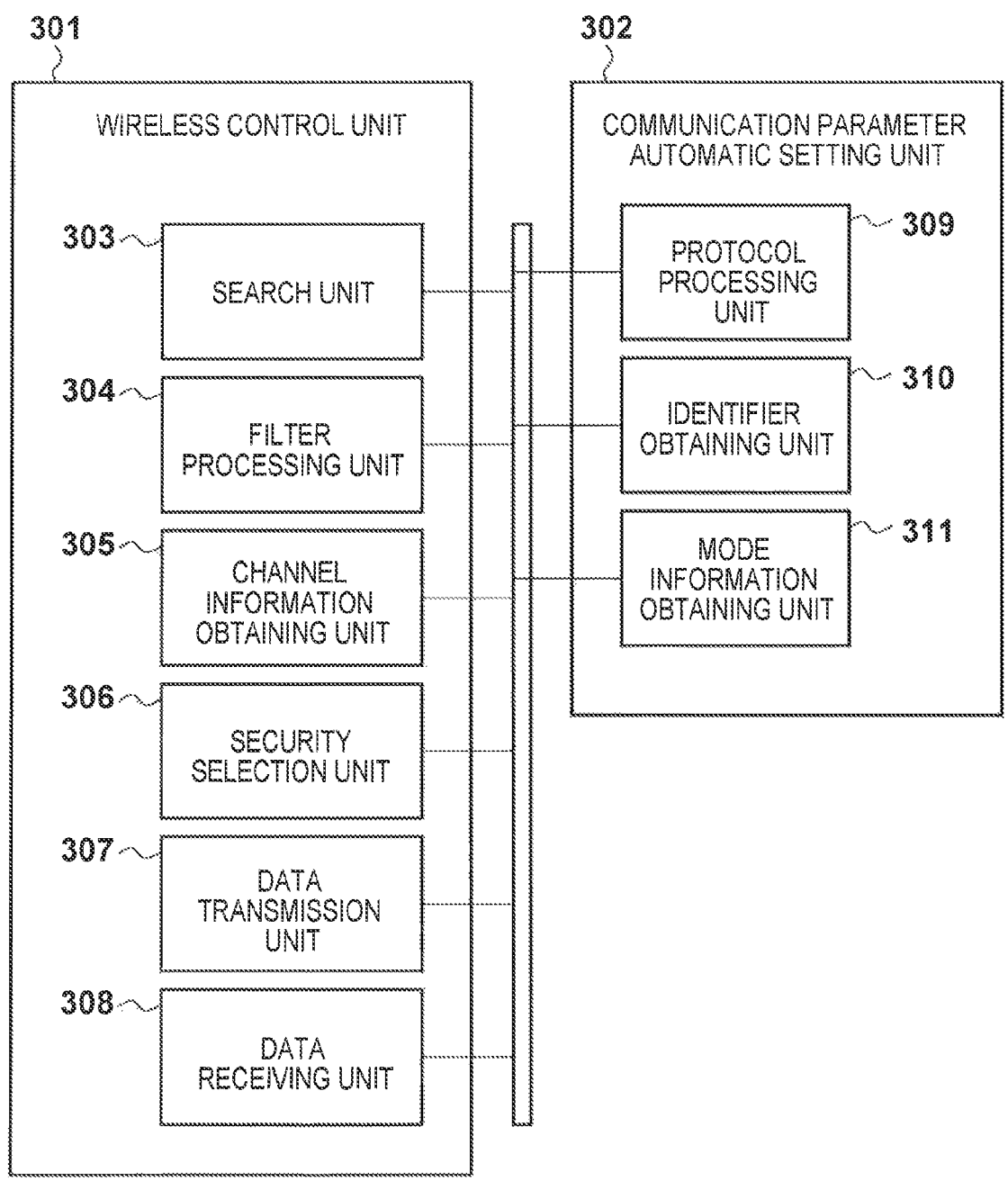
FIG. 3 is a block diagram illustrating software functions within the communication apparatus.

FIG. 3 illustrates an example of the configuration of a software function block to be executed by the control unit 203. The software function block to be executed by the control unit 203 includes a wireless control unit 301 and a communication parameter automatic setting unit 302.

The wireless control unit 301 includes a search unit 303, a filter processing unit 304, a channel information obtaining unit 305, a security selection unit 306, a data transmission unit 307, and a data receiving unit 308, and controls the wireless unit 206.

The communication parameter automatic setting unit 302 includes a protocol processing unit 309, an identifier obtaining unit 310, and a mode information obtaining unit 311, and controls automatic setting of communication parameters. The search unit 303 searches for a communicable wireless network around the communication apparatus 201. The filter processing unit 304 specifies a wireless network serving as a candidate for the connection destination out of one or more wireless networks that have been found by the search unit 303, based on a BSSID, which is defined by the IEEE 802.11 series. The channel information obtaining unit 305 obtains information on the wireless channel of a network to which a connection is currently established.

The security selection unit 306 decides a security method based on parameters obtained by communication parameter automatic setting and the result of the wireless network search. The data transmission unit 307 performs processing for transmitting data. The data receiving unit 308 performs processing for receiving data.

The protocol processing unit 309 performs protocol processing for communication parameter automatic setting. The identifier obtaining unit 310 obtains a BSSID in the course of protocol processing for communication parameter automatic setting. The mode information obtaining unit 311 obtains mode information with respect to communication parameter automatic setting in the course of protocol processing for communication parameter automatic setting.

Next, a processing procedure from communication parameter automatic setting to completion of connection of the STA will be described with reference to a flowchart in FIG. 4.

In step S401, for example, a user instruction that has been input to the input unit 205 acts as a trigger, causing the communication parameter automatic setting unit 302 to perform communication parameter automatic setting processing, and thus the communication parameter automatic setting unit 302 obtains communication parameters. The communication parameters contain an ESSID (Extended Service Set Identifier). The ESSID functions as a network identifier for identifying a wireless network. Moreover, when the ESSID is obtained by communication parameter automatic setting, a BSSID (Basic Service Set Identifier) is also obtained. The BSSID functions as a base station identifier for identifying a wireless base station (identification information regarding a communication unit provided in the base station). For example, wireless parameters such as the ESSID, the security method, and the like of the NW1, which is the network for communication, are obtained on the NW2, which is the network used for communication parameter automatic setting. At this time, the BSSID of the NW2 is also obtained. It should be noted that the BSSID of the NW2 identifies the AP1. Since the AP1 has the multi-BSSID function, there may be a plurality of BSSIDs regarding the AP1, but all of those BSSIDs can identify the AP1.

In step S402, once the search unit 303 has obtained the communication parameters, it searches for a wireless network around the communication apparatus 201. During the search, wireless networks to be found by the search may be specified using the ESSID contained in the obtained communication parameters. In this case, the search unit 303 searches for a network having the same ESSID as the ESSID contained in the obtained communication parameters and obtains the BSSID the found network. Then, a base station constructing the found network is determined.

In step S403, once the search has been completed, the search unit 303 determines whether or not the number of networks that were found by the search (hereinafter referred to as the "detection number") is 0. If it is determined that the detection number is 0 (step S403; YES), processing returns to step S402. On the other hand, if it is determined that the detection number is not 0 (step S403; NO), processing proceeds to step S404.

In step S404, the search unit 303 determines whether or not the detection number is more than 1. If it is determined that the detection number is more than 1 (step S404; YES), processing proceeds to step S405. On the other hand, if it is determined that the detection number is 1 (step S404; NO), processing proceeds to step S407.

In step S405, based on the BSSID, the filter processing unit 304 performs BSSID filter processing that specifies a candidate for the connection destination using the result of the wireless network search. Details of the BSSID filter processing will be described later.

In step S406, once a candidates for the connection destination has been specified by the filter processing unit 304, the search unit 303 determines whether or not the number of candidates for the connection destination is more than 0 (step S406). If it is determined that the number of candidates for the connection destination is more than 0 (step S406; YES), processing proceeds to step S407. On the other hand, if it is determined that the number of candidates for the connection destination is 0 (step S406; NO), processing returns to step S402.

In step S407, the control unit 203 performs connection processing using the communication parameters in accordance with the determination result described above. In step S408, the control unit 203 determines whether or not the connection processing was successfully performed. If it is determined that the connection processing was successfully performed (step S408; YES), processing is ended. On the other hand, if it is determined that the connection processing failed (step S408; NO), processing returns to step S402.

Figure 5:
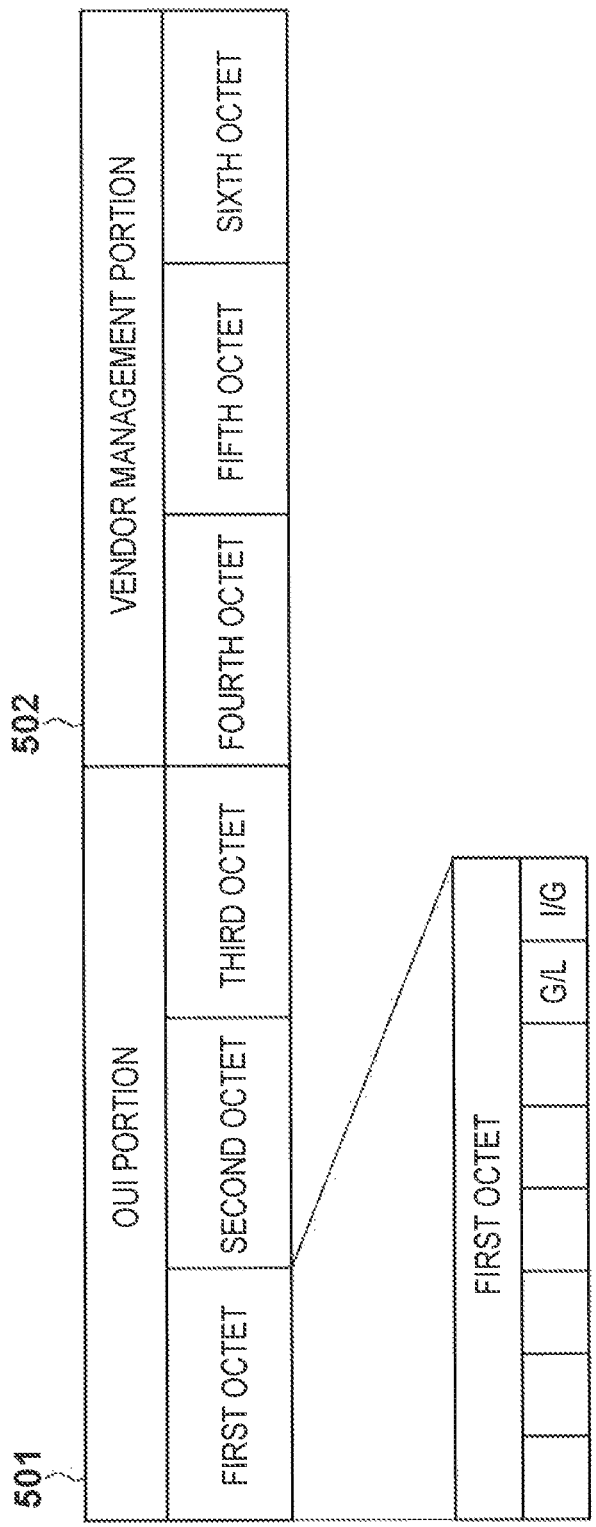
FIG. 5 is a conceptual diagram of a MAC address.

Next, the BSSID filter processing performed by the filter processing unit 304 will be described with reference to FIGS. 5, 6, 7, and 8. FIG. 5 is a conceptual diagram illustrating the format of a hardware address (hereinafter referred to as the "MAC address") used for a BSSID.

The MAC address is defined as having a length of 48 bits, and is composed of first to sixth octets. The first to third octets serve as an OUI (Organizationally Unique Identifier) portion 501, in which a unique value is assigned to each vendor. The fourth to sixth octets serve as a vendor management portion 502, and vendors are supposed to manage values that are assigned to the vendor management portion 502.

The first bit (a predetermined bit) of the first octet is called an I/G bit. Moreover, the second bit (a specific bit) of the first octet is called a G/L bit. If the G/L bit is 0, it indicates that the MAC address is a Global address, and if the G/L bit is 1, it indicates that the MAC address is a Local address. In the case of a Local address, it is possible to assign any appropriate address, but care should be taken because there is a possibility that an address collision may occur.

The multi-BSSID function requires that a single access point should have a plurality of BSSIDs so that a plurality of wireless networks can be identified. Moreover, the manner in which BSSIDs are assigned in the case of the multi-BSSID differs from vendor to vendor. Two BSSID assignment methods will be described below.

First BSSID Assignment Method

Assuming that the BSSID of a first network is 00:11:22:33:44:55, the BSSID of a second network is obtained by processing the BSSID of the first network in the following manner. The G/L bit of the BSSID of the first network is changed to 1, and at the same time, the bits other than the G/L and I/G bits of the first octet are changed. For example, 02:11:22:33:44:55, 0A:11:22:33:44:55, and the like can be used as BSSIDs of subordinate networks.

Second BSSID Assignment Method

Assuming that the BSSID of the first network is 00:11:22:33:44:55, the BSSID of the second network is obtained by processing the BSSID of the first network in the following manner. The numerical value of the sixth octet of the BSSID of the first network is incremented by 1. In the case where a third network is constructed, the resultant numerical value of the sixth octet of the BSSID of the second network is further incremented by 1. As a result, the BSSID of the second network is 00:11:22:33:44:56, and the BSSID of the third network is 00:11:22:33:44:57. The BSSID filter processing will be described below on the basis of these multi-BSSID specifications.

Figure 6:
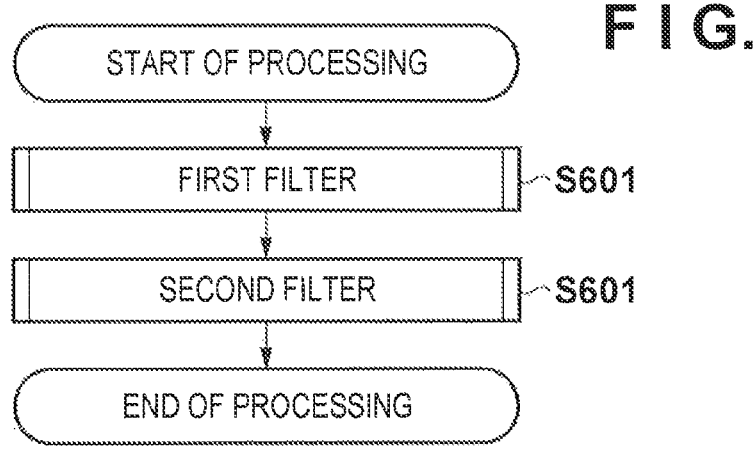
FIG. 6 is a flowchart illustrating a BSSID filter of the communication apparatus according to the first embodiment.

A flowchart in FIG. 6 illustrates the procedure of BSSID filter processing. In step S601, the filter processing unit 304 initially performs first filter processing, thereby specifying a wireless network corresponding to the first BSSID assignment method as a candidate for the connection destination. In step S602, the filter processing unit 304 then performs second filter processing, thereby specifying a wireless network corresponding to the second BSSID assignment method as a candidate for the connection destination. After that, processing is ended.

In the present embodiment, a method that uses both the first filter and the second filter is described as an example, but it is also possible to use only one of these filters. Moreover, it is also possible to perform filtering by combining the first filter and/or the second filter with a filter of a method other than those exemplary filters.

Figure 7:
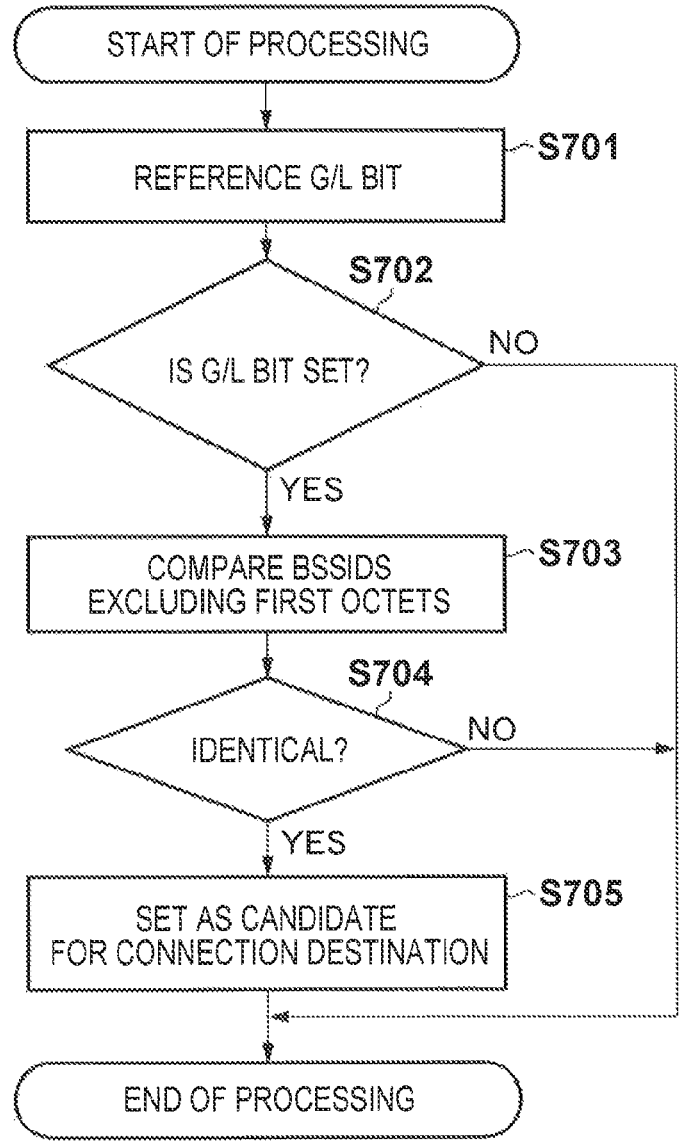
FIG. 7 is a flowchart illustrating a first filter of the communication apparatus according to the first embodiment.

A flowchart in FIG. 7 illustrates the processing procedure of the first filter processing in step S601.

In step S701, the filter processing unit 304 references the G/L bit. In step S702, the filter processing unit 304 determines whether or not the G/L bit of any of the BSSID that has been initially obtained by communication parameter automatic setting and the BSSID of a network that has been detected by network search is 1. If it is determined that there is a BSSID whose G/L bit is 1 (step S702; YES), processing proceeds to step S703. On the other hand, if it is determined that there is no BSSID whose G/L bit is 1 (step S702; NO), processing is ended.

In step S703, the filter processing unit 304 compares the BSSID that has been obtained by communication parameter automatic setting excluding the first octet with the BSSID of the network that has been detected by network search excluding the first octet. More specifically, for example, the BSSID that rues been obtained by communication parameter automatic setting and the BSSID of the network that has been detected by network search are compared with each other to see whether the bits of these BSSIDs excluding the G/L bits and I/G bits are identical.

In step S704, the filter processing unit 304 determines whether or not the BSSIDs excluding the first octets are identical. If it is determined that the BSSIDs excluding the first octets are identical (step S704; YES), processing proceeds to step S705. On the other hand, if it is determined that the BSSIDs excluding the first octets are not identical (step S704; NO), processing is ended. In step S705, the filter processing unit 304 sets the network whose BSSID excluding the first octet is identical with the BSSID that has been obtained by communication parameter automatic setting as a candidate for the connection destination. Thus, processing is ended.

Figure 8:
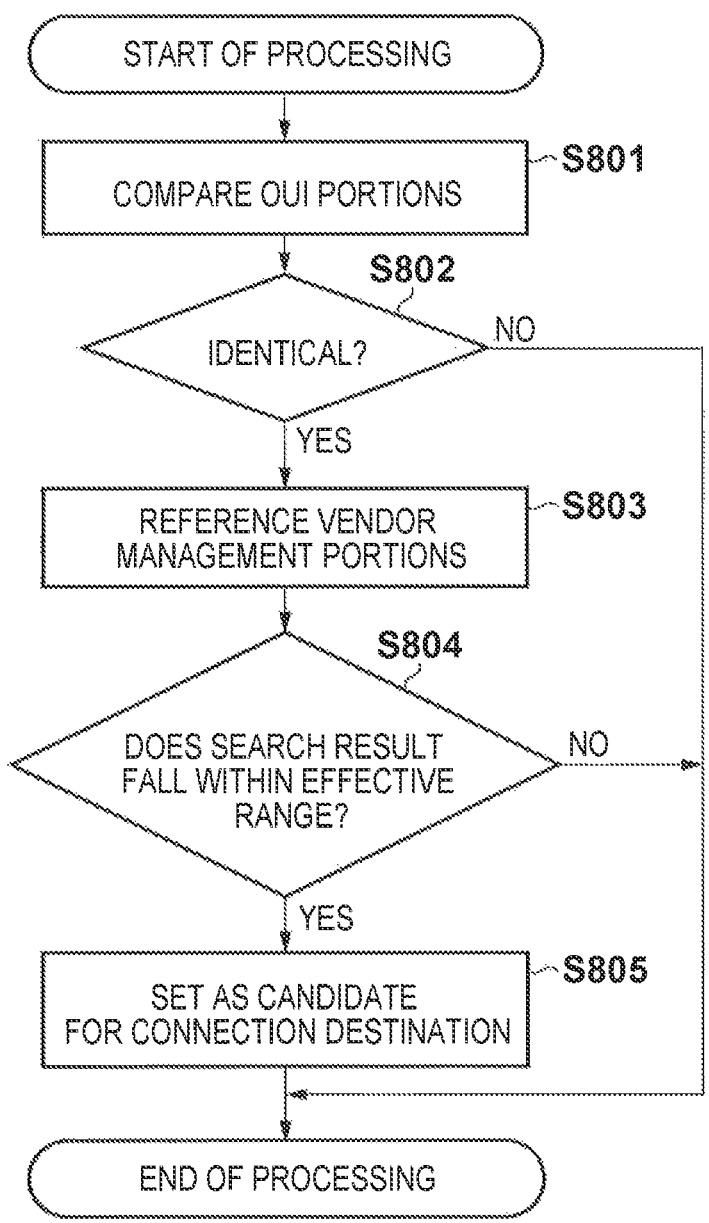
FIG. 8 is a flowchart illustrating a second filter of the communication apparatus according to the first embodiment.

A flowchart in FIG. 8 illustrates the processing procedure of the second filter processing in step S602. In step S801, the filter processing unit 304 compares the OUI portion of the BSSID that has been initially obtained by communication parameter automatic setting with the OUI portion of the BSSID of a network that has been detected by network search.

In step S802, the filter processing unit 304 determines whether or not the OUI portions are identical with each other. If it is determined that the OUI portions are identical with each other (step S802; YES), processing proceeds to step S803. On the other hand, if it is determined that the OUI portions are not identical with each other (step S802; NO), processing is ended.

In step S803, the filter processing unit 304 references the vendor management portion (excluding the OUI portion) of the BSSID of the network that has been detected by network search. In step S804, the filter processing unit 304 sets numerical values obtained by incrementing and decrementing the vendor management portion of the BSSID that has been obtained by communication parameter automatic setting by a predetermined numerical value as an effective range, and determines whether or not the vendor management portion of the BSSID network that has been detected by network search falls within the effective range.

For example, assuming that the BSSID that has been obtained by communication parameter automatic setting is 00:11:22:33:44:55 and the predetermined value is 3, the resultant effective range is 00:11:22:33:44:52 to 00:11:22:33:44:58.

If it is determined that the vendor management portion of the BSSID of the network that has been detected by network search falls within the effective range (step S804; YES), processing proceeds to step S805. On the other hand, if it is determined that the vendor management portion does not fall within the effective range (step S804; NO), processing is ended.

In step S805, the filter processing unit 304 sets the network that has been detected by network search as a candidate for the connection destination. Thus, processing is ended.

Figure 9:
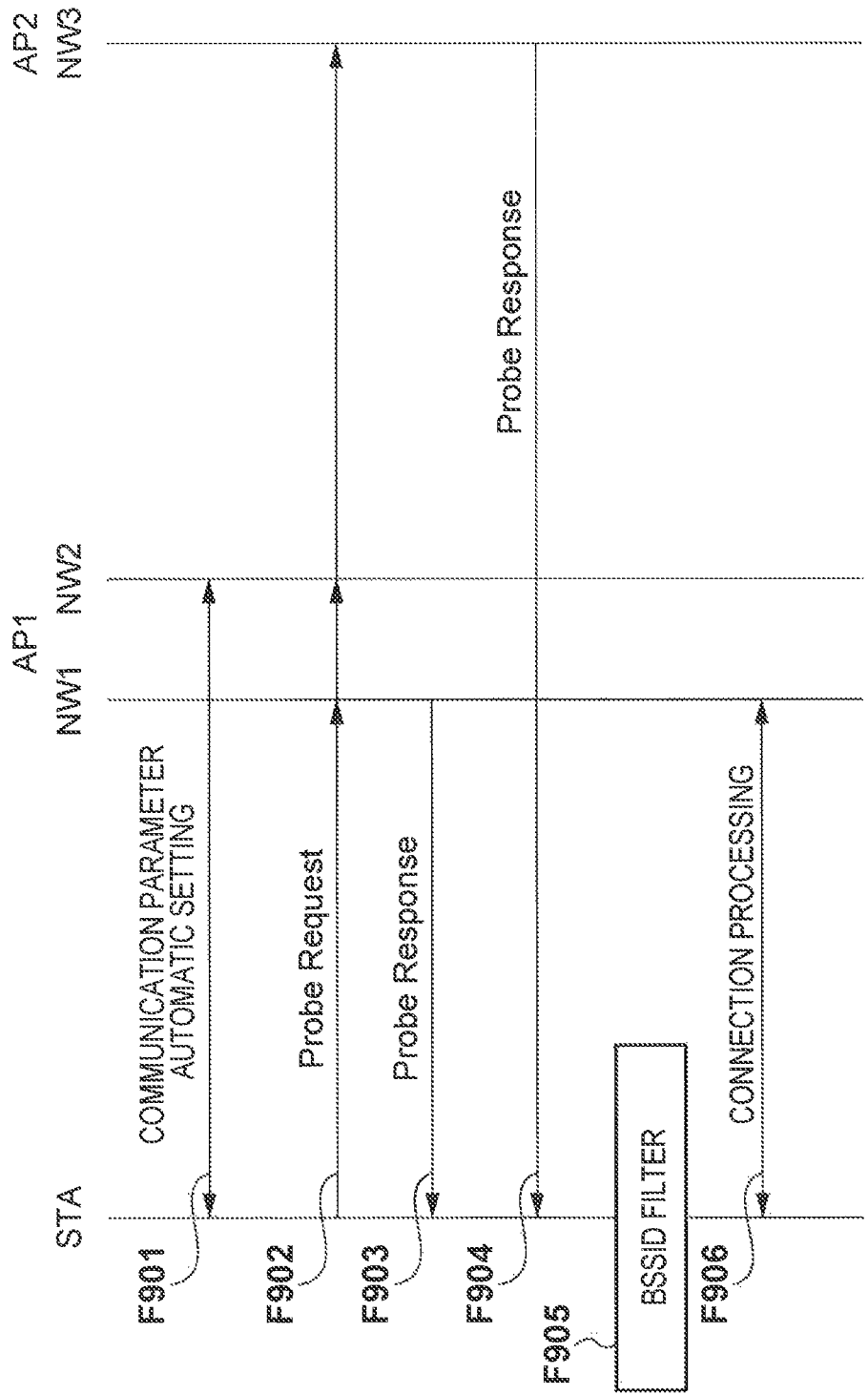
FIG. 9 is a diagram illustrating a sequence of processing that is performed among communication apparatuses according to the first embodiment.

FIG. 9 is a sequence diagram illustrating processing that is performed when the STA performs communication parameter automatic setting with the NW2 of the AP1 and connects to the NW1 of the AP1. The AP1 is simultaneously constructing the NW1 and the NW2 by means of the multi-BSSID function, and the NW1 is used as a network for communication, while the NW2 is used as a network for communication parameter automatic setting. The AP2 is constructing only the NW3.

Here, communication parameters of the wireless networks (NW1, NW2, and NW3) will be described with reference to FIG. 10. The ESSID of the NW1 is AAA, and the BSSID thereof is 00:11:22:33:44:35. Moreover, with regard to the security method, WPA1-TKIP and WPA2-TKIP are simultaneously operated due to the Mixed mode, and the encryption key is shared by the both security methods and set to XXX.

The ESSID of the NW2 is BBB, and the BSSID thereof is 02:11:22:33:44:55. Moreover, the security method is OPEN-WEP64, and the encryption key is set to YYY. The ESSID of the NW3 is AAA, and the BSSID thereof is 00:AA:BB:CC:DD:EE. Moreover, with regard to the security method, WPA1-TKIP and WPA2-AES are simultaneously operated due to the Mixed mode, and the encryption key is shared by the both security methods and set to ZZZ.

As described above, the NW1 and the NW3 have the same ESSID and also can share the same security method, WPA1-TKIP. However, different encryption keys are set for these networks.

In FIG. 9, the STA performs communication parameter automatic setting with the AP1 and the NW2 (F901). Moreover, the STA obtains the BSSID of the NW2 in the course of communication parameter automatic setting. The STA obtains the following communication parameters, the ESSID: AAA, the security method: WPA1-TKIP, and the encryption key: XXX, by communication parameter automatic setting.

Once communication parameter automatic setting has been finished, the STA broadcasts a probe request in order to search for a wireless network having the same ESSID as that contained in the obtained communication parameters (F902). It is possible to designate the ESSID in the probe request, and thus, it is possible to receive a response only from a wireless network having the same ESSID as the designated content. In this example, the operation in the case where the ESSID is designated in the probe request will be described, but a method in which all of the search results that have been obtained without designating any ESSID are searched for a wireless network having the same ESSID as the ESSID contained in the obtained communication parameters may also be employed.

The NW1 of the AP1 has the same ESSID as the ESSID designated in the probe request, and therefore, the AP transmits a probe response to the STA (F903). Also, the NW3 of the AP2 has the same ESSID as the ESSID designated in the probe request, and the AP2 transmits a probe response to the STA as well (F904).

Once network search has been finished, the STA performs the BSSID filter processing (F905). The BSSID of the NW2 that has been obtained in the course of communication parameter automatic setting is 02:11:22:33:44:55, and the BSSID of the NW1 that has been obtained by network search is 00:11:22:33:44:55. Here, certain predetermined portions of first identification information (the BSSID of the NW2) and second identification information (the BSSID of the NW1) that are different from the first octets are compared with each other. Since the G/L bit of the ESSID of the NW2 is 1, and the two BSSIDs excluding the first octets are identical, the NW1 is set as a candidate for the connection destination by the first filter. That is to say, out of one or more wireless networks, a wireless network with respect to which the difference between the BSSID that has been obtained by communication parameter automatic setting and the BSSID of that wireless network that has been obtained during network search falls within a predetermined range is specified as a candidate for the connection destination.

On the other hand, the NW3 is not set as a candidate for the connection destination by either the first filter processing or the second filter processing. Consequently, the NW1 is specified as the connection destination, and the STA performs connection processing with the NW1 using the obtained communication parameters (F906). Once the connection processing has been completed, data communication can be performed.

As described above, according to the present embodiment, the first identification information (a BSSID) indicating identification information on a base station configuring a first wireless network is obtained by communication parameter automatic setting processing (first obtaining processing), and the second identification information (a BSSID) indicating identification information on a base station configuring a second wireless network is obtained by network search (second obtaining processing). Then, whether or not the difference between the first identification information and the second identification information falls within a predetermined range is determined, and if it is determined that the difference falls within the predetermined range, connection processing for establishing a connection to the second wireless network is executed.

It should be noted that in the present embodiment, although an example in which connection processing that uses the BSSID filter is performed immediately after communication parameter automatic setting has been described, it is also possible to adopt a configuration in which conventional connection processing is executed immediately after communication parameter automatic setting and a processing error or an elapse of a certain period of time triggers off switching of processing. Here, examples of the conventional connection processing include a method in which a connection to a network with higher radio field intensity among the results of network search is preferentially established, a method in which a connection to a network on a channel of a smaller numerical value is established earlier, and so on.

According to the first embodiment, the network to which a connection is to be established can be specified based on the BSSID, and thus, in connection processing after parameter automatic setting, the connection to an unintended network can be inhibited. As a result, the efficiency of connection processing can be improved, and the time from the start of parameter automatic setting to the completion of connection can be reduced.

Second Embodiment

Next, a second embodiment according to the present invention will be described with reference to the drawings. It should be noted that the configuration of a network system and the configuration of a communication apparatus according to the second embodiment are the same as those according to the first embodiment, which have been described with reference to FIGS. 1 to 3, and therefore, descriptions thereof will be omitted.

Figure 11:
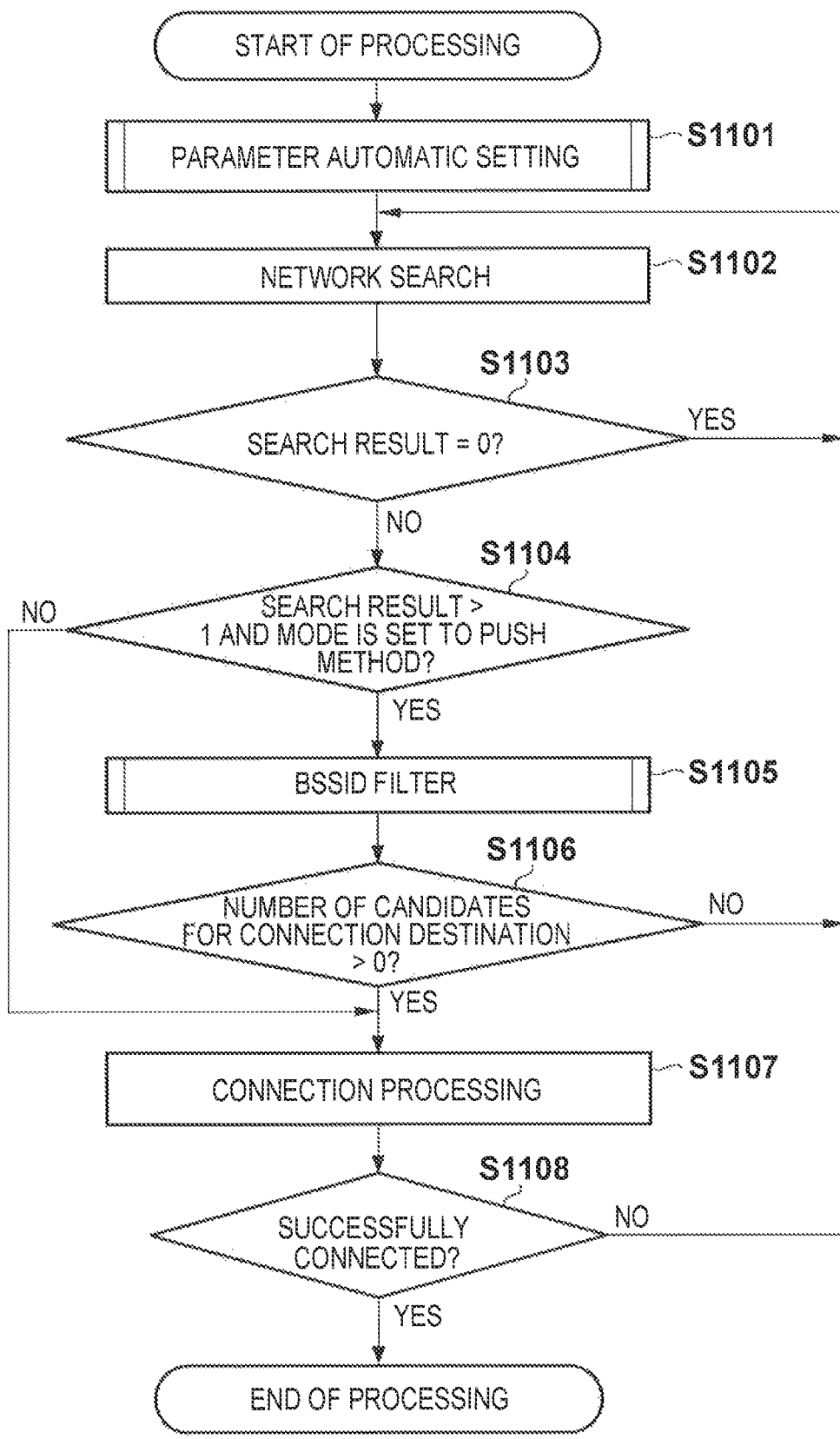
FIG. 11 is a flowchart illustrating a processing procedure of a communication apparatus according to a second embodiment.

The processing procedure from communication parameter automatic setting to completion of connection of an STA according to the second embodiment will be described with reference to a flowchart in FIG. 11. The STA has a capability to obtain mode information of communication parameter automatic setting and wireless channel information (hereinafter referred to as the "channel information") in the course of processing for communication parameter automatic setting.

In step S1101, the communication parameter automatic setting unit 302 performs communication parameter automatic setting processing and obtains communication parameters. The channel information obtaining unit 305 obtains a BSSID, mode information (information indicating the type of the method of automatic setting) of communication parameter automatic setting, and the channel information in the course of communication parameter automatic setting.

Communication parameter automatic setting processing may include a plurality of modes such as a push-button method (hereinafter referred to as the "push method"), an authentication code method, and the like, and the communication parameter automatic setting unit 302 stores which mode has been used to perform communication parameter automatic setting processing. Moreover, in a wireless LAN network, the channel used for communication is fixed, and the communication parameter automatic setting unit 302 stores the channel information regarding the channel that has been used during communication parameter automatic setting processing.

Processing in steps S1102 and S1103 is the same as the processing in steps S402 and S403, and therefore, descriptions thereof will be omitted. In step S1104, the search unit 303 determines whether or not the detection number, which is the result of network search, is more than one and whether or not communication parameter automatic setting has been performed by the push method. If it is determined that the detection number is more than one and the communication parameter automatic setting has been performed by the push method (step S1104; YES), processing proceeds to step S1105. On the other hand, if it is determined that the detection number is one or that the communication parameter automatic setting has not been performed by the push method (step S1104; NO), processing proceeds to step S1107.

In step S1105, the filter processing unit 304 performs BSSID filter processing for specifying the candidate for the connection destination from the results of wireless network search based on the BSSID. In the BSSID filter processing, the channel information that has been obtained during communication parameter automatic setting is added to the filtering conditions.

The first filter corresponds to the first BSSID assignment method and sets only a wireless network on the same channel as the channel information as a candidate for the connection destination. Similarly, the second filter corresponds to the second BSSID assignment method and sets only a wireless network on the same channel as the channel information as a candidate for the connection destination.

The addition of the channel information to the filtering conditions can be applied to only one of the first filter and the second filter, or can be applied to both as in the example described above. Processing in steps S1106 to S1108 are the same as the processing in steps S406 to S408, and therefore, descriptions thereof will be omitted.

An example in which the addition of the determination of whether or not to perform BSSID filtering based on the mode information and the addition of limiting conditions based on the channel information to BSSID filtering are performed at the same time has been described above, but it is also possible to apply only one of them.

According to the second embodiment, the mode information and the channel information that have been obtained during communication parameter automatic setting are used, and thus the network specifying accuracy can be improved even more. As a result, the time from the start of parameter automatic setting to the completion of connection can be reduced.

Third Embodiment

Next, a third embodiment according to the present invention will be described in detail with reference to the drawings. It should be noted that the configuration of a network system and the configuration of a communication apparatus according to the third embodiment are the same as those according to the first embodiment, which have been described with reference to FIGS. 1 to 3, and therefore, descriptions thereof will be omitted.

Figure 12:
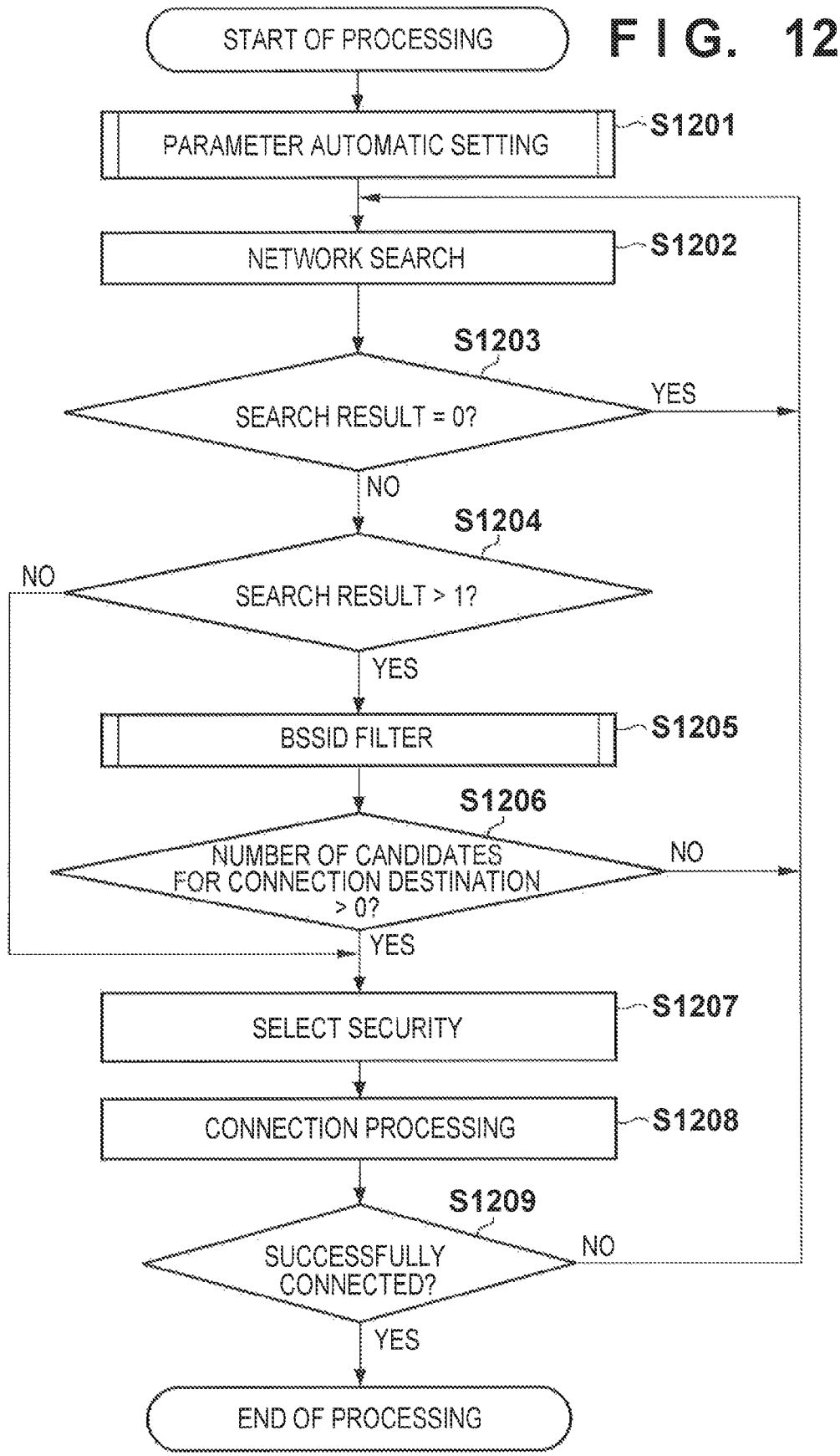
FIG. 12 is a flowchart illustrating a processing procedure of a communication apparatus according to a third embodiment.

The processing procedure from communication parameter automatic setting to completion of connection of an STA will be described with reference to a flowchart in FIG. 12.

The STA has a capability to compare the security method that has been obtained by communication parameter automatic setting with a security method that can be determined based on the result of network search and determine whether replacement with the stronger security method is possible. Moreover, the STA also has a capability to, in the case where a plurality of candidates for the connection destination are present, select the connection destination out of those candidates based on information on the security method.

Processing in steps S1201 to S1206 are the same as the processing in steps S401 to S406, and therefore, descriptions thereof will be omitted.

In step S1207, the security selection unit 306 compares the security method that has been obtained by communication parameter automatic setting with the security method of a wireless network that has been set as a candidate for the connection destination, and if replacement with the stronger security method is possible, the stronger security method is selected. The security method of the wireless network can be determined by using the result of network search. Moreover, if the stronger security method is absent, the security method that has been obtained by communication parameter automatic setting is used.

In step S1208, the control unit 203 performs connection processing using the communication parameters that have been obtained by communication parameter automatic setting and the security method that has been selected in step S1207. Processing in step S1209 is the same as the processing in step S408, and therefore, descriptions thereof will be omitted. Thus, processing is ended.

Figure 13:
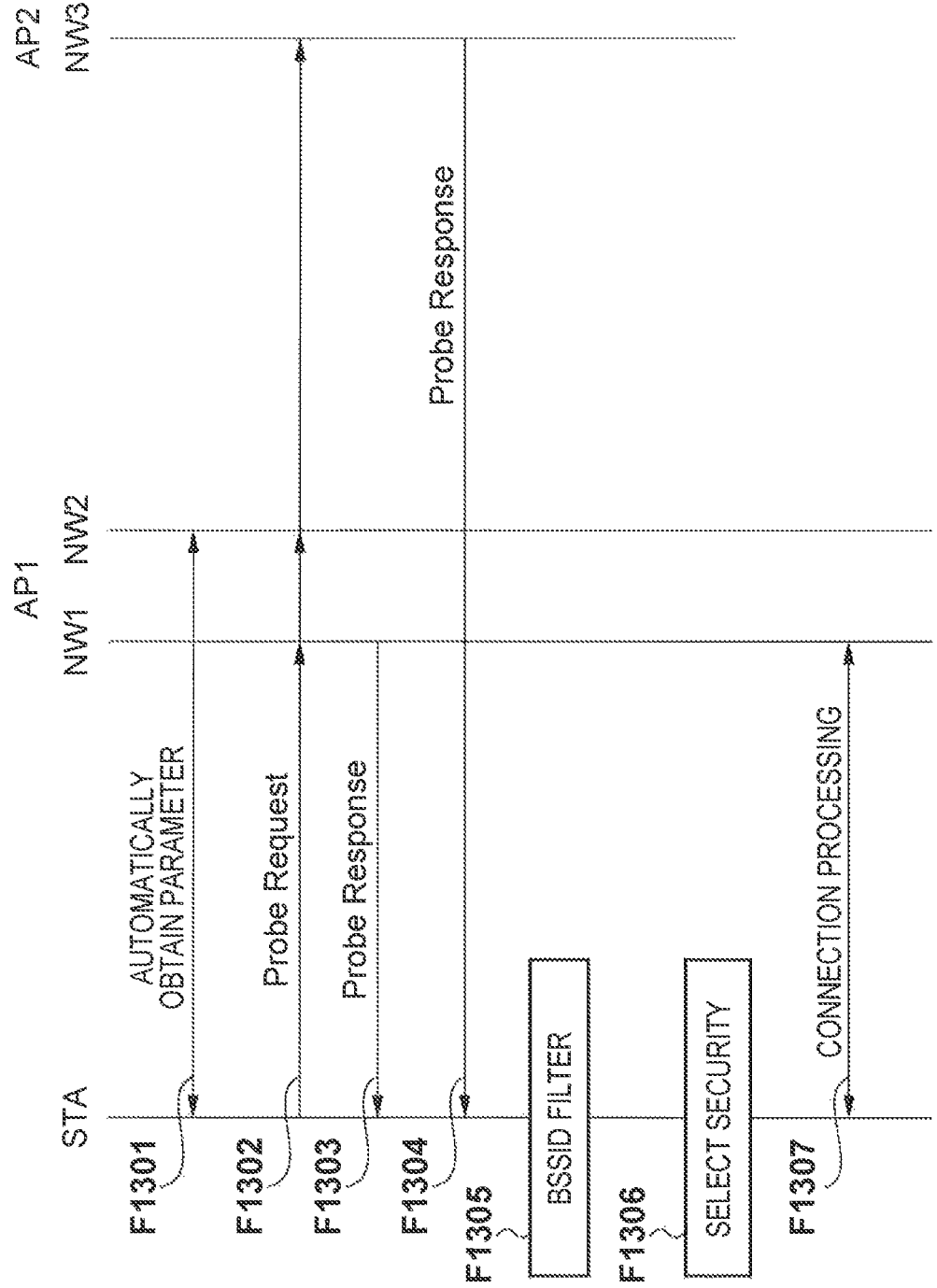
FIG. 13 is a diagram illustrating a sequence of processing that is performed among communication apparatuses according to the third embodiment.

FIG. 13 is a sequence diagram illustrating processing that is executed when the STA of the third embodiment performs communication parameter automatic setting with the NW2 of the AP1 and connects to the NW1 of the AP1.

Processing in F1301 to F1305 are the same as the processing in F901 to F905 in FIG. 9, and therefore, descriptions thereof will be omitted.

After processing in F1305, the security selection unit 306 compares the security method that has been obtained by communication parameter automatic setting with the security method of the NW1 that has been determined based on the probe response in F1303, and selects a security method (F1306). Since the security method of the NW1 is WPA1-TKIP and WPA2-TKIP and the security method that has been obtained by parameter automatic setting is WPA1-TKIP, replacement with WPA2-TKIP having the higher security strength is possible. Thus, the STA selects WPA2-TKIP as the security method used for connection processing.

Then, the STA performs connection processing for establishing a connection to the NW1 using the security method that has been selected in F1306 (F1307). Once the connection processing has been completed, data communication can be performed.

In the present embodiment, a method for performing data communication in higher security by adding security selection processing to the first embodiment has been described. Similarly, security selection can also be added to the processing described in the second embodiment as an example, and the same effect as that of the present embodiment can be achieved.

As described above, according to the present embodiment, a network identifier, information on a first security method, and an encryption key corresponding to the first security method are obtained. Then, a search for a network corresponding to the obtained network identifier is performed, and if a network that has been found by the search supports a second security method that has higher security strength than the first security method, the obtained encryption key is applied to the second security method to execute connection processing for establishing a connection to that network.

According to the third embodiment, a network is specified by BSSID filtering before it is determined whether the security method can be replaced, and thus, the possibility that a wrong security method may be selected can be reduced. Accordingly, an improvement in the security and a reduction in the time from the start of parameter automatic setting to the completion of connection can be realized.

Fourth Embodiment

Next, a fourth embodiment according to the present invention will be described in detail with reference to the drawings. It should be noted that the configuration of a network system and the configuration of a communication apparatus according to the fourth embodiment are the same as those of the first embodiment, which have been described with reference to FIGS. 1 to 3, and therefore, descriptions thereof will be omitted. In the present embodiment, the processing procedure for selecting a method of communication parameter automatic setting when performing communication parameter automatic setting and the processing procedure for selecting a network to which a connection is to be established in order to perform communication parameter automatic setting will be described.

Figure 14:
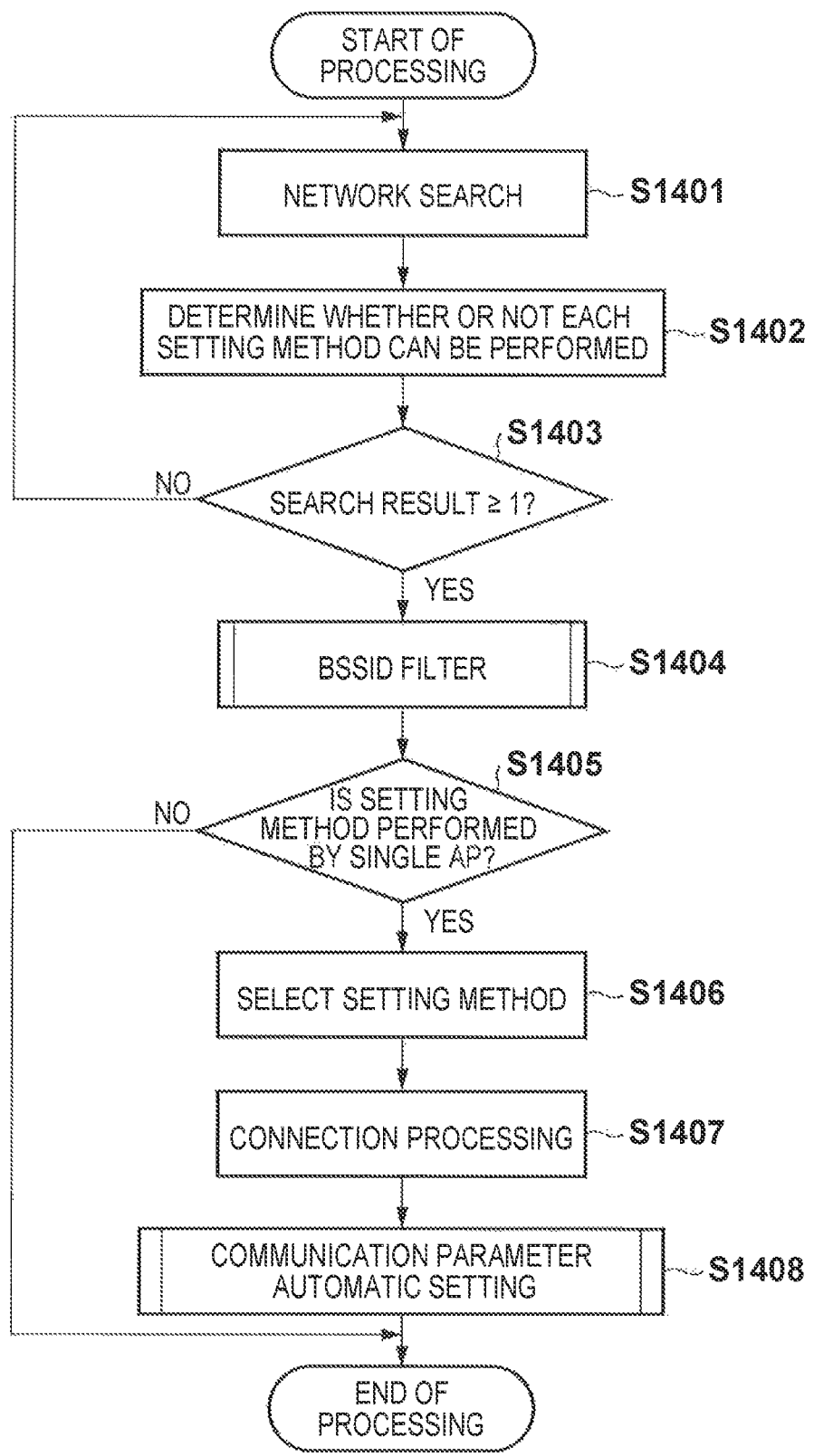
FIG. 14 is a flowchart illustrating a processing procedure of a communication apparatus according to a fourth embodiment.

The processing procedure from when communication parameter automatic setting that can be executed by the STA is determined based on network search until when a connection is established in order to perform communication parameter automatic setting will be described with reference to a flowchart in FIG. 14.

Figure 4:
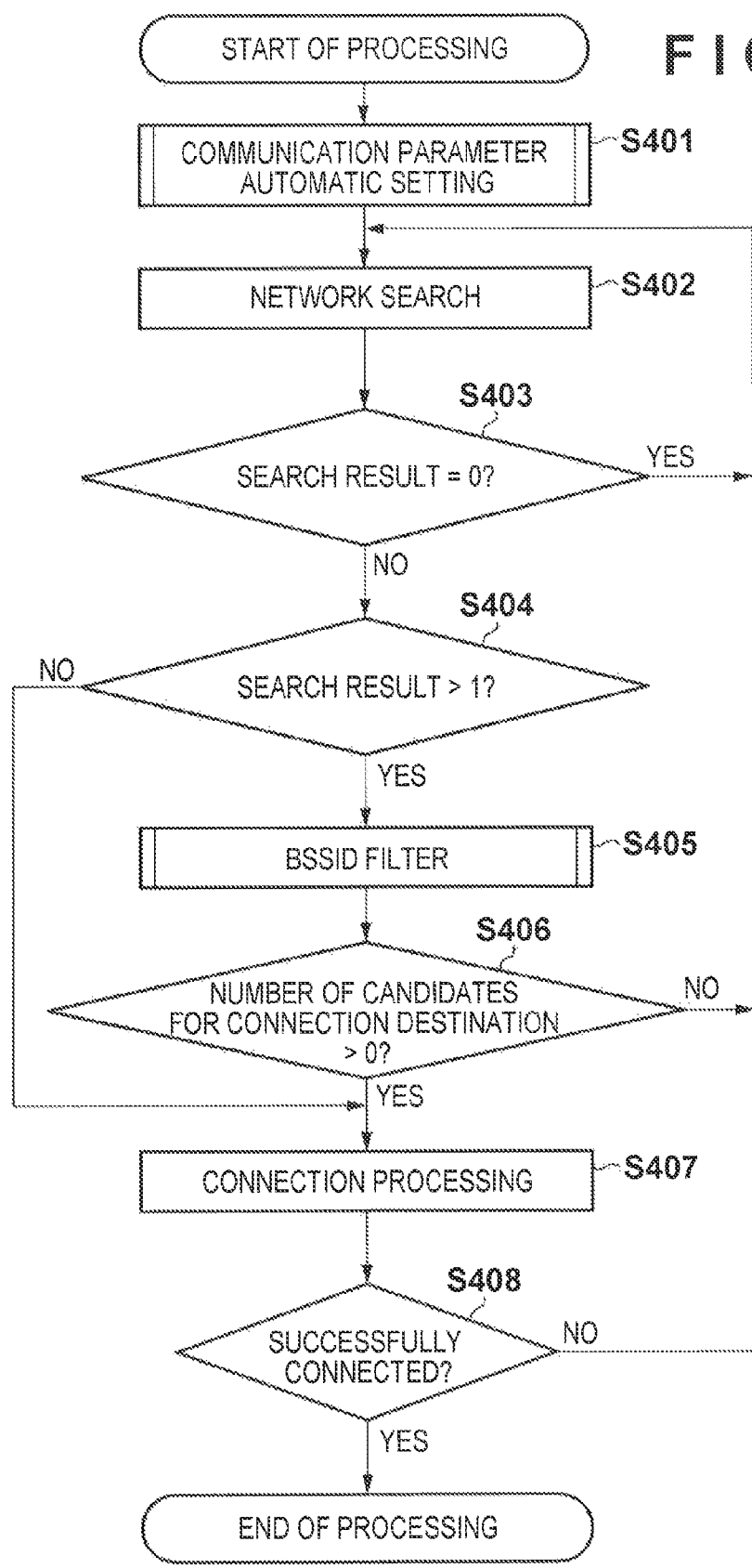
FIG. 4 is a flowchart illustrating a processing procedure of a communication apparatus according to a first embodiment.

In step S1401, the search unit 303 searches for a wireless network around the STA as in step S402 in FIG. 4. The wireless network search can be performed by transmitting a probe request and receiving a probe response as a reply to the probe request. It is also possible to obtain wireless network information by receiving a beacon.

In step S1402, the communication parameter automatic setting unit 302 determines a setting method of communication parameter automatic setting that can be performed by each wireless network based on the wireless network information obtained in step S1401. Based on the result of determination, only a wireless network with respect to which it is determined that automatic setting can be performed is retained, and the rest may be discarded.

There are a plurality of methods in which a communication parameter automatic setting method that can be performed is determined based on the wireless network information. An example thereof is a method in which the communication parameter automatic setting method can be determined by referencing a specific value of IEs (Information Elements) contained in the probe request. Another example is a method in which the communication parameter automatic setting method can be determined based on whether or not the ESSID contained in the probe request is a predetermined identifier. It should be noted that although methods in which the communication parameter automatic setting method is determined based on the IEs and the ESSID have been described here, it is also possible to use a method other than these methods. In step S1402, it is possible to specify a network on which communication parameter automatic setting can be performed out of wireless networks around the STA by applying any of the determination methods.

In step S1403, based on the result of processing in step S1402, the search unit 303 determines whether or not the number of networks on which automatic setting can be performed is one or more. If it is determined that the number of the found networks is one or more (step S1403; YES), processing proceeds to step S1404. On the other hand, if it is determined that the number of the found networks is 0 (step S1403; NO), processing returns to step S1401.

In step S1404, the filter processing unit 304 performs BSSID filter processing. BSSID filter processing is the same as that in steps S601 to S602 in FIG. 6. It is also possible to use only one of the exemplary filters shown in FIG. 6 as is the case with the first embodiment. Furthermore, it is also possible to perform filtering by combining the first filter and/or the second filter with a filter of a method other than these exemplary filters. It should be noted that details of the first filter processing in step S601 and the second filter processing in step S602 will be described later with reference to flowcharts in FIGS. 15 and 16, respectively.

In step S1405, based on the result of the BSSID filter processing in step S1404, the communication parameter automatic setting unit 302 determines whether or not communication parameter automatic setting can be performed on only a single wireless network or whether or not, even though communication parameter automatic setting can be performed on a plurality of wireless networks, all of the networks are networks constructed by a single base station. As a result of determination in step S1405, if communication parameter automatic setting can be performed by a plurality of base stations (step S1405; NO), communication parameter automatic setting desired by the user cannot be uniquely determined, and thus, processing is ended. The reason for this is that if a plurality of base stations can perform communication parameter automatic setting, which base station the user intends to perform communication parameter automatic setting with cannot be determined based on network search. On the other hand, if the result of determination in step S1405 is that only a single base station can perform communication parameter automatic setting (step S1405; YES), processing proceeds to step S1406.

In step S1406, the communication parameter automatic setting unit 302 selects a setting method for communication parameter automatic setting. If the base station can perform only a single setting method, this setting method is selected. If the base station can perform a plurality of setting methods, a setting method is selected from the plurality of setting methods in accordance with a predetermined policy. With regard to the policy, a method in which a setting method with higher security level for communication parameter automatic setting is preferentially selected or a method in which a setting method having higher connectivity and being capable of obtaining a plurality of communication parameters is preferentially selected may be used, and a method other than these methods can also be used.

In step S1407, once the control unit 203 has decided the setting method, it connects to a wireless network in order to execute communication parameter automatic setting. The wireless network to which a connection is established at this time is a wireless network on which the setting method that has been selected in step S1406 can be performed.

Figure 15:
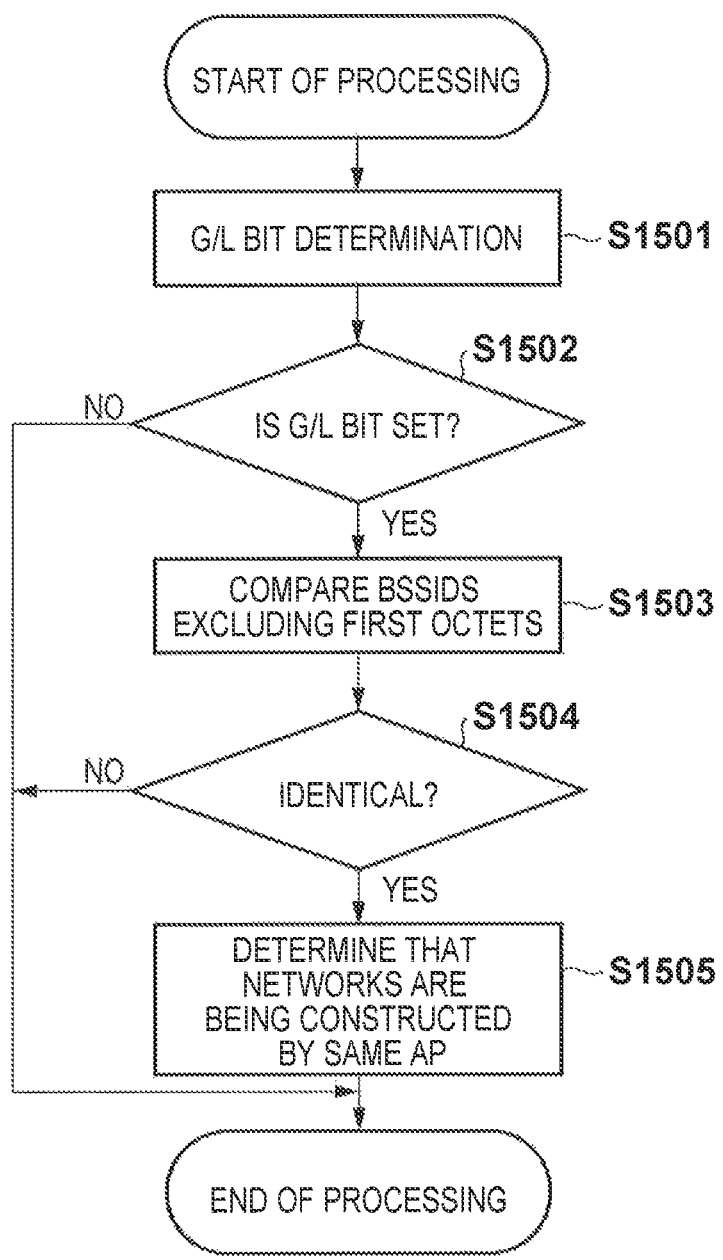
FIG. 15 is a flowchart illustrating a first filter of the communication apparatus according to the fourth embodiment.

In step S1408, once the connection has been completed, the communication parameter automatic setting unit 302 executes communication parameter automatic setting processing in conformity with a protocol of each setting method. Thus, processing of the flowchart in FIG. 14 is ended. Now, a flowchart in FIG. 15 illustrates a processing procedure of the first filter processing according to the fourth embodiment. Processing in steps S1501 to S1504 is the same as the processing in steps S701 to S704 in FIG. 7 except that, in steps S1501 to S1504, wireless networks detected by network search are compared with each other.

In step S1505, if it is determined in step S1504 that the BSSIDs excluding the first octets are identical, the filter processing unit 304 determines that the two networks that have been compared are wireless networks constructed by a single base station. It should be noted that although FIG. 15 illustrates a method in which the BSSIDs excluding the first octets are compared with each other if the G/L bit is 1 as in FIG. 7, the BSSIDs excluding the first octets may be compared with each other irrespective of the value of the G/L bit, or another method that can confirm that the BSSIDs excluding predetermined portions are identical with each other may be used.

Figure 16:
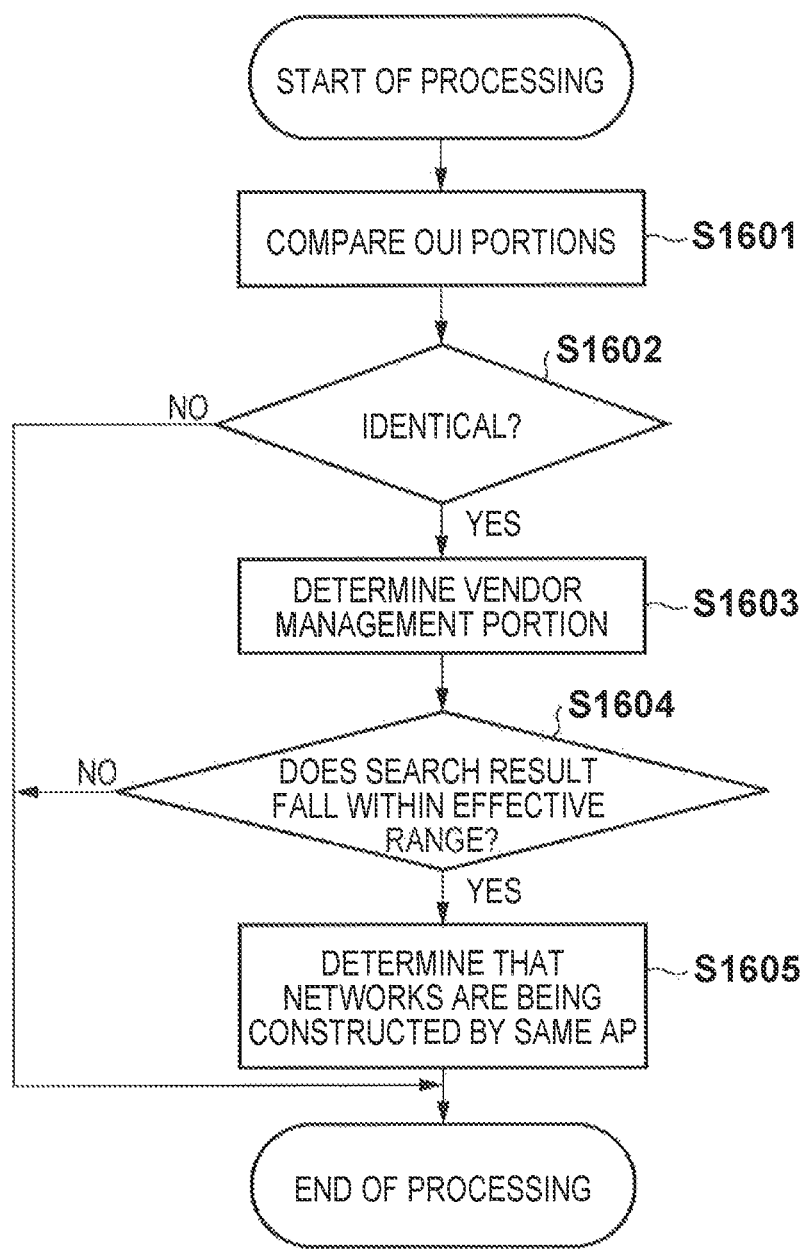
FIG. 16 is a flowchart illustrating a second filter of the communication apparatus according to the fourth embodiment.

A flowchart in FIG. 16 illustrates a processing procedure of the second filter processing according to the fourth embodiment. Processing in steps S1601 to S1604 in FIG. 16 is the same as the processing in steps S801 to S804 in FIG. 8 except that, in steps S1601 to S1604, wireless networks detected by network search are compared with each other.

In step S1605, if it is determined in step S1604 that the vendor management portion of the BSSID falls within the effective range, the filter processing unit 304 determines that the two networks that have been compared are wireless networks constructed by a single base station. It should be noted that although FIG. 16 illustrates a method in which the vendor management portions are compared with each other if the OUI portions are identical with each other, the BSSIDs excluding a few low-order bits of the sixth octets may be compared with each other, or another method that can confirm that the search result falls within the effective range may be used.

Figure 17:
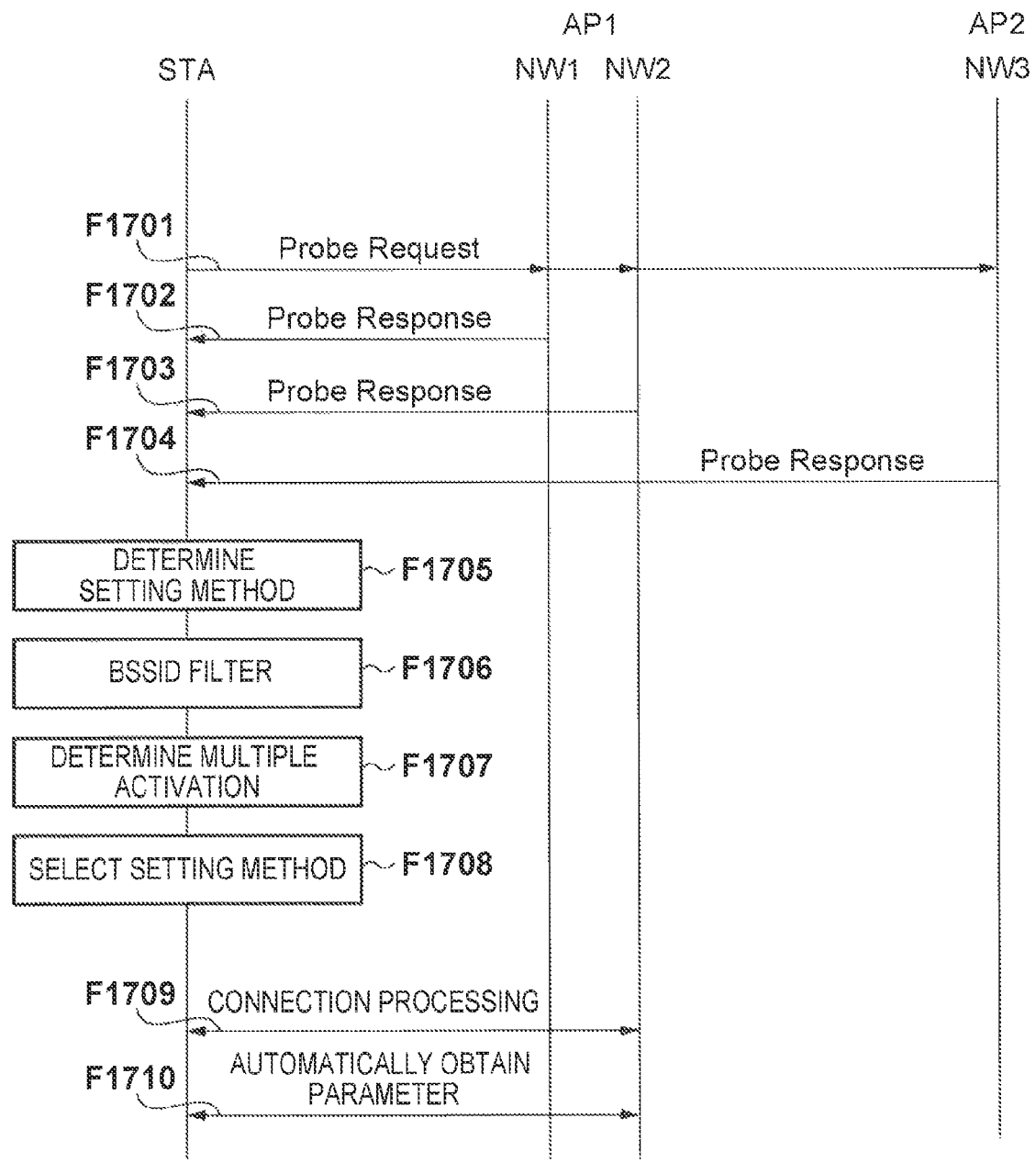
FIG. 17 is a diagram illustrating a sequence of processing that is performed among communication apparatuses according to the fourth embodiment.

FIG. 17 is a sequence diagram illustrating processing that is executed when the STA determines that the AP1 can perform communication parameter automatic setting on the NW1 and the NW2 based on the result of network search and connects to the NW2. It is assumed that the AP1 is simultaneously constructing the NW1 and the NW2 by means of the multi-BSSID function and communication parameter automatic setting can be performed on both of the NW1 and the NW2. On the other hand, it is assumed that the AP2 is constructing only the NW3 and communication parameter automatic setting cannot be performed. Details of processing illustrated in FIG. 17 will be described later.

Now, with reference to FIG. 18, communication parameters and the state of communication parameter automatic setting of each of the wireless networks (NW1, NW2, and NW3) will be described. The ESSID of the NW1 is AAA, and the ESSID thereof is 00:11:22:33:44:55. Moreover, with respect to the setting method of communication parameter automatic setting, it is set that Type-A can be performed, and the method for determining the Type-A setting method based on network search is set to be the IEs. An example of a protocol in conformity with which whether or not communication parameter automatic setting can be performed can be determined based on the IEs is the WPS.

Furthermore, the ESSID of the NW2 is typeB, and the BSSID thereof is 02:11:22:33:44:55. Moreover, with respect to the setting method for communication parameter automatic setting, it is set that Type-B can be performed, and the method for determining the Type-B setting method based on the result of network search is set to be the ESSID. In this example, since the ESSID is typeB, it is possible to determine that the Type-B setting method can be performed.

On the other hand, the ESSID of the NW3 is AAA, and the BSSID thereof is 00:AA:BB:CC:DD:EE. Moreover, the NW3 is in a state in which communication parameter automatic setting cannot be performed. Accordingly, there also is no identification information.

As described above, the AP1 is constructing the NW1 and the NW2, and the NW1 is in a state in which the Type-A setting method can be performed and the NW2 is in a state in which the Type-B setting method can be performed. Moreover, it is assumed that Type-A has higher security level than Type-B, and Type-B has higher connectivity than Type-A.

Next, details of sequence processing in FIG. 17 will be described. The STA broadcasts a probe request in order to search for a wireless network (F1701). The AP1 transmits a probe response for the NW1 to the STA (F1702) and, furthermore, transmits a probe response for the NW2 to the STA as well (F1703). Also, the AP2 transmits a probe response for the NW3 to the STA (F1704).

In the probe response of F1702, in addition to information on the ESSID and the security method, IEs of the Type-A setting method is provided. Moreover, in the probe response of F1703, typeB is set as the ESSID. Once the STA has received the probe responses from the APs, the STA judges whether communication parameter automatic setting can be performed on each NW (F1705). In this example, the STA references the IEs in the probe response that has been received from the NW1, thereby judging that the Type-A setting method can be executed on the NW1. Then, the STA references the ESSID in the probe response that has been received from the NW2, thereby judging that the Type-B setting method can be performed on the NW2. Moreover, the STA references the probe response that has been received from the NW3, thereby judging that communication parameter automatic setting cannot be executed on the NW3.

Once the setting method determination processing has been finished, BSSID filter processing is performed (F1706). The BSSID of the NW2 is 02:11:22:33:44:55, and the BSSID of the NW1 is 00:11:22:33:44:55. Since the G/L bits of the BSSIDs of the NW1 and the NW2 are 1, and the two BSSIDs excluding the first octets are identical, it is determined by the first filter that the NW1 and the NW2 are wireless networks constructed by the same base station (in this example, the AP1). That is to say, among one or more wireless networks, wireless networks with respect to which the difference between respective network BSSIDs that have been obtained by the search falls within a predetermined range are determined as being constructed by the same base station.

Once the BSSID filter processing has been finished, multiple activation determination processing for communication parameter automatic setting is performed (F1707). Since it has been recognized by the BSSID filter that the NW1 and the NW3 are networks constructed by the same AP, it is determined that only a single AP is performing communication parameter automatic setting processing. If the NW3 rather than the NW2 is in a state in which the Type-B setting method can be performed, it is judged that communication parameter automatic setting can be performed by a plurality of APs, and processing is ended. At this time, it is possible to prompt the user to execute communication parameter automatic setting again after an elapse of a certain period of time by notifying the user that communication parameter automatic setting has failed because it is performed by a plurality of APs.

Once the multiple activation determination processing has been finished, a setting method of communication parameter automatic setting is selected (F1708). The STA, giving higher priority to the connectivity, selects Type-B in accordance with a predetermined policy. Once the STA has selected Type-B as the setting method, the STA performs connection processing for establishing a connection to the NW2 in order to perform communication parameter automatic setting (F1709). Once the connection processing has been completed, the STA performs sharing processing for sharing communication parameters that are necessary for a connection to the network and executes communication parameter automatic setting processing, in accordance with the Type-B setting method protocol (F1710).

As described above, according to the present embodiment, as in step S401, the first identification information (the BSSID) indicating the identification information regarding the base station configuring the first wireless network is obtained by network search (first obtaining processing), and the second identification information (the BSSID) indicating the identification information regarding the base station configuring the second wireless network is also obtained by network search (second obtaining processing). Then, as in step S405, whether or not the difference between the first identification information and the second identification information falls within a predetermined range is determined, and if it is determined that the difference falls within the predetermined range, connection processing for establishing a connection to the second wireless network is executed as in step S407. Thus, in the fourth embodiment, a method in which whether or not a plurality of wireless networks on which communication parameter automatic setting can be performed are constructed by the same base station is determined has been described as an example.

According to the fourth embodiment, whether a plurality of wireless networks on which communication parameter automatic setting can be performed are networks constructed by the same base station can be determined by the BSSID filter. That is to say, since a wireless network out of a plurality of wireless networks that have been found by network search can be specified by the BSSID filter, a base station performing communication parameter automatic setting can be more accurately specified. This makes it possible to reduce the time taken to establish a connection.

As described above, according to the present invention, a network constructed by an AP performing automatic setting can be specified as a network to which a connection is to be established, and accordingly, the time required for connection processing can be reduced. Furthermore, a base station performing communication parameter automatic setting can be more accurately specified when a setting method of communication parameter automatic setting is specified by network search. Accordingly, the time taken to establish a connection can be reduced.

According to the present invention, it is possible to efficiently search a plurality of networks for a network serving as a connection destination.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-053557 filed on Mar. 10, 2011, and No. 2012-017271 filed on Jan. 30, 2012, which are hereby incorporated by reference herein in their entirety.

What is claimed is:

1. A communication apparatus comprising:
a processor; and
a memory storing instructions that, when executed by the processor, cause the communication apparatus to function as:
  a detection unit configured to detect a wireless network in which the communication apparatus can execute predetermined communication parameter setting processing, wherein the setting processing is used for sharing a wireless parameter;
  a determination unit configured, if a plurality of wireless networks are detected by the detection unit, to determine whether the detected plurality of wireless networks are provided by a single apparatus based on a Basic Service Set Identifier (BSSID) of each of the plurality of the wireless networks, wherein the BSSID is defined by the IEEE 802.11 series; and
  a sharing unit configured:
  1) to share, if the determination unit determines that the detected plurality of wireless networks are provided by a single apparatus, a wireless parameter in one of the detected plurality of wireless networks between the communication apparatus and the single apparatus, and
  2) not to share, if the determination unit determines that the detected plurality of wireless networks are not provided by a single apparatus, a wireless parameter in any of the detected plurality of wireless networks,
  wherein the determination unit determines that the detected plurality of wireless networks are provided by a single apparatus if a difference between a BSSID of a first wireless network and a BSSID of a second wireless network falls within a predetermined range.

2. The communication apparatus of claim 1, wherein the instructions further cause the communication apparatus to function as a connection unit configured to, if the determination unit determines that the detected plurality of wireless networks are provided by a single apparatus, connect the single apparatus for setting a wireless parameter.

3. The communication apparatus of claim 2, wherein if the single apparatus is constructing a first network and a second network having higher security strength than the first network, the connection unit connects to the second network.

4. The communication apparatus of claim 2, wherein if the determination unit determines that the detected plurality of wireless networks are not provided by a single apparatus, the connection unit does not perform connection processing.

5. The communication apparatus of claim 2, wherein the sharing unit after connection shares a wireless parameter by the connection unit.

6. The communication apparatus of claim 1, wherein the determination unit further determines that the detected plurality of wireless networks are provided by a single apparatus if predetermined portions of the BSSID of the first wireless network and the BSSID of the second wireless network are identical with each other.

7. The communication apparatus of claim 6, wherein the predetermined portions are portions that are different from first octets of the BSSID of the first wireless network and the BSSID of the second wireless network, respectively.

8. The communication apparatus of claim 6, wherein the predetermined portions are OUI portions of the BSSID of the first wireless network and the BSSID of the second wireless network, respectively.

9. The communication apparatus of claim 1, wherein the wireless parameter is a parameter for performing a wireless communication in conformity with the IEEE 802.11 standard series, and wherein the wireless parameter includes information of a network identifier, an encryption method, an encryption key, an authentication method, and an authentication key.

10. The communication apparatus of claim 1, wherein the predetermined communication parameter setting processing includes a plurality of types of communication parameter setting processing.

11. The communication apparatus of claim 10, wherein at least one of the plurality of types of communication parameter setting processing is Wi-Fi Protected Setup (WPS).

12. A method for controlling a communication apparatus, the method comprising:
  detecting a wireless network in which the communication apparatus can execute predetermined communication parameter setting processing;
  using the setting processing for sharing a wireless parameter;
  determining, if a plurality of wireless networks are detected, whether the detected plurality of wireless networks are provided by a single apparatus based on a BSSID of each of the plurality of the wireless networks, wherein the BSSID is defined by the IEEE 802.11 series;
  sharing, if it is determined that the detected plurality of wireless networks are provided by a single apparatus, a wireless parameter in one of the detected plurality of wireless networks between the communication apparatus and the single apparatus, and not sharing, if it is determined that the detected plurality of wireless networks are not provided by a single apparatus, a wireless parameter in any of the detected plurality of wireless networks; and
  determining that the detected plurality of wireless networks are provided by a single apparatus if a difference between a BSSID of a first wireless network and a BSSID of a second wireless network falls within a predetermined range.

13. A non-transitory computer-readable storage medium storing a computer program for causing a computer to execute a method for controlling a communication apparatus, the method comprising:
- detecting a wireless network in which the communication apparatus can execute predetermined communication parameter setting processing;
- using the setting processing for sharing a wireless parameter;
- determining, if a plurality of wireless networks are detected, whether the detected plurality of wireless networks are provided by a single apparatus based on a BSSID of each of the plurality of the wireless networks, wherein the BSSID is defined by the IEEE 802.11 series;
- sharing, if it is determined that the detected plurality of wireless networks are provided by a single apparatus, a wireless parameter in one of the detected plurality of wireless networks between the communication apparatus and the single apparatus, and not sharing, if it is determined that the detected plurality of wireless networks are not provided by a single apparatus, a wireless parameter in any of the detected plurality of wireless networks; and
- determining that the detected plurality of wireless networks are provided by a single apparatus if a difference between a BSSID of a first wireless network and a BSSID of a second wireless network falls within a predetermined range.

* * * * *